Aug. 23, 1938.   A. Y. DODGE   2,127,719
CLUTCH MECHANISM
Original Filed March 14, 1932

INVENTOR
ADIEL Y. DODGE
BY
ATTORNEY

Patented Aug. 23, 1938

2,127,719

UNITED STATES PATENT OFFICE 2,127,719

CLUTCH MECHANISM

Adiel Y. Dodge, South Bend, Ind., assignor to Bendix Aviation Corporation, South Bend, Ind., a corporation of Delaware Original application March 14, 1932, Serial No. 598,855. Patent No. 2,087,968, dated July 27, 1937. Divided and this application May 10, 1937, Serial No. 141,704

2 Claims. (Cl. 192—77)

This invention relates to clutches.

An object of the invention is to provide a clutch mechanism in which a servo clutch shoe rotates with the flywheel secured to the driving shaft of a prime mover.

Another object of the invention is to provide a clutch mechanism in which a clutch shoe rotates with the flywheel of a prime mover, and in which centrifugal force assists in applying the clutch shoe.

A further object of the invention is to provide a clutch mechanism including means for assisting in the actuation of the clutch shoes for disengagement when the work overruns the flywheel.

A still further object of the invention is to provide a clutch mechanism including means assisting the aforementioned centrifugal mechanism in the actuation of the clutch to engage the same.

Figure 1:
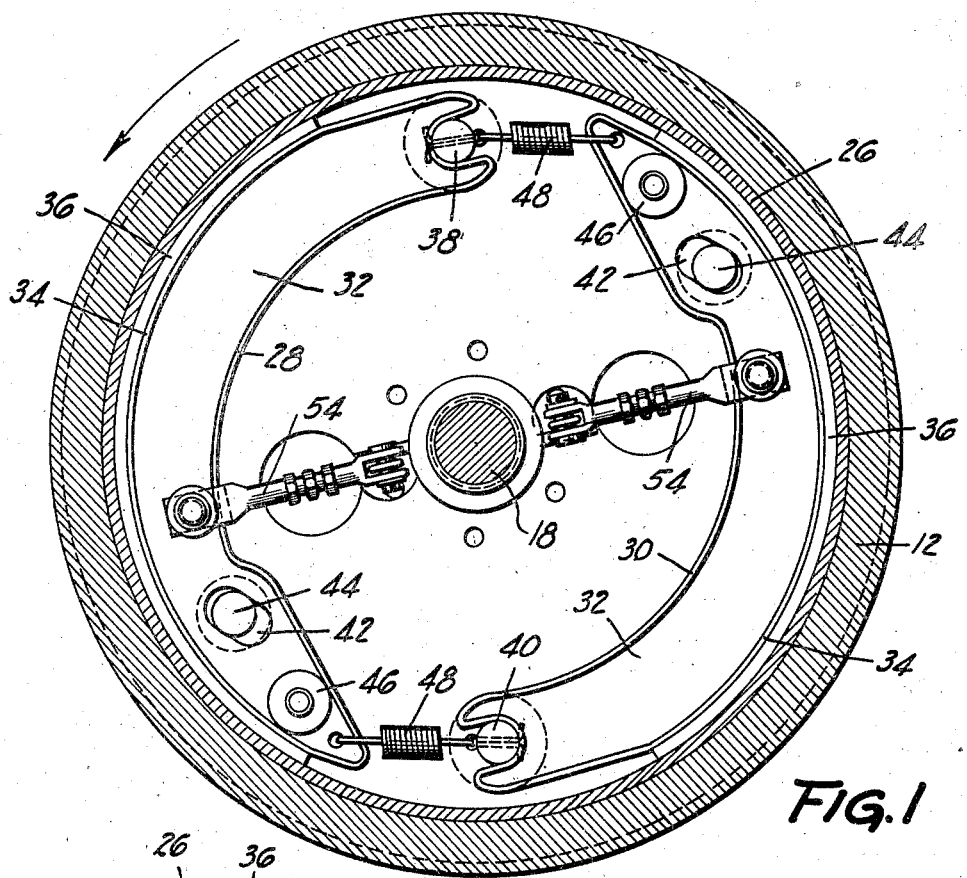
Figure 2:
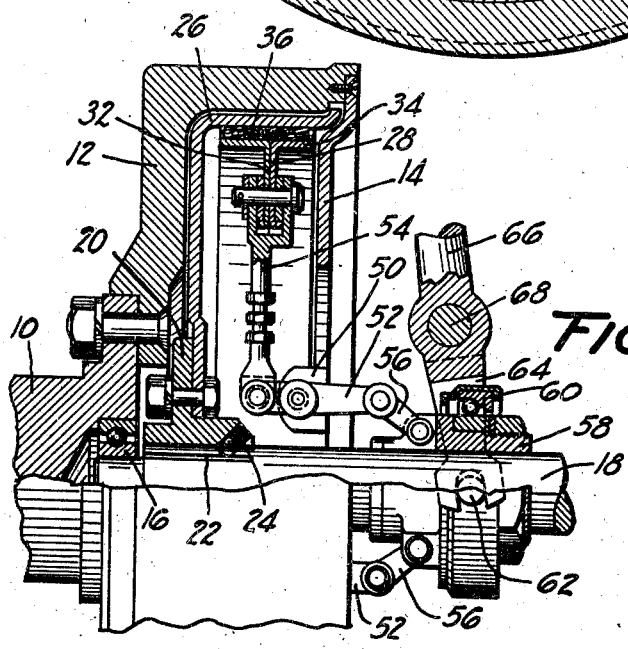

Other objects of the invention and desirable details of construction and combinations of parts will become apparent from the following description of a preferred embodiment, which description is taken in conjunction with the accompanying drawing, in which:

Figure 1 is a vertical sectional view illustrating a preferred form of the invention; and Figure 2 is a side elevation, partly in section and partly broken away, of the form of the invention illustrated in Figure 1.

Referring to the drawing for more specific details of the invention, 10 represents the driving shaft of a prime mover, not shown. This shaft has bolted or otherwise secured thereto a flywheel 12, rotatable in a counterclockwise direction, as indicated by the arrow disclosed in Figure 1. The latter member has suitably secured to the flange thereof a dust shield or backing plate 14, which may be of any preferred type.

Journaled in one end of the driving shaft in suitable bearings 16 is a driven shaft 18. This shaft has positioned thereon a collar 20. As shown, the collar is splined to the shaft as indicated at 22 and secured against axial movement by a set screw 24. Bolted or otherwise secured to the collar is a drum 26 arranged within the flywheel concentrically thereto and in spaced relation, so that rotation between the drum and the flywheel may be effected without these parts engaging one another.

The backing plate 14 has positioned thereon corresponding and interchangeable clutch shoes 28 and 30. Each of the shoes includes a web 32, supporting a rim 34, to which is suitably secured lining 36 adaptable for cooperation with the clutching surface of the drum. As shown, the shoes 28 and 30 are anchored on the backing plate as indicated at 38 and 40.

The toes of the shoes are provided with suitable openings 42 adaptable for the reception of fixed pins 44, arranged on the backing plate. The openings 42 are so arranged with respect to the pins 44 that upon engagement of the shoes with the clutching surface of the drum said shoes are permitted to wedge into drum engagement. Each shoe has suitably secured to the toe thereof a weight 46, and connecting the toe of each shoe to the anchor for the other shoe is a return spring 48.

In this structure, the shoes rotate with the flywheel and are moved into drum engagement, in part by the centrifugal force due to rotation and in part by manually operable means now to be described.

As disclosed, the driving shaft 10 of the prime mover has journaled in one end thereof a suitable bearing for the driven shaft 18. The driven shaft has splined thereto at 22 the aforementioned flange 20, to which is bolted or otherwise secured the drum 26. The drum 26 is nested in the flywheel 12, with suitable clearance between the drum and the flywheel.

Pivoted on lugs 50 secured to the plate 14 are rocker arms 52. Each of these arms has one end connected by a suitable adjustable link 54 to corresponding shoes 28 and 30, anchored on the backing plate as indicated at 38 and 40. The other ends of the arms 52 are connected, through suitable linkage 56, to a sleeve 58 positioned for rotation on the driven shaft 18, and suitably mounted on the sleeve 58 is a collar 60 having trunnions 62 engaged between the bifurcated ends of a yoke 64 formed on one end on a hand operating lever 66 pivoted as indicated at 68. By operating the lever 66, the sleeve 58 may be moved coaxially with respect to the driven shaft, to rock the levers 52 and move the shoes into drum engagement.

Describing now the operation of the mechanism constituting the invention, the shoes rotate with the flywheel and are moved into drum engagement, in part by the centrifugal force developed by the weights 46 and in part by the manual operation of the lever 66. The clutch applying effect is, of course, dependent upon the size of the weights 46 and the tension of the springs 48. Under the action of the rotating flywheel the shoes move outwardly, fulcruming about the anchors 38 and 40 as pivots, this movement being counteracted by the action of the return springs 48, which act to move the clutch shoes out of engagement with the drum 26. It is, of course, to be understood that the springs serve to disengage the clutch at or below a certain speed of the flywheel, the manually operated lever 66, of course, being released. It is further to be noted that the shoes 28 and 30 are of a self-energizing type, since the toes of the shoes are wedged into drum engagement.

The invention heretofore described is disclosed in my copending application Serial No. 598,855, filed March 14, 1932, which has become Patent No. 2,087,968, issued July 27, 1937, this application constituting a division thereof.

While one illustrative embodiment has been described, it is not my intention to limit the scope of the invention to that particular embodiment, or otherwise than by the terms of the appended claims.

I claim:

1. A clutch comprising a driving member, a hollow flywheel secured thereto, a dust plate secured to the flange of the flywheel, a driven member, a drum on the driven member arranged coaxially within the flywheel, anchors on the dust plate, friction members pivoted on the anchors, and movable by centrifugal force into drum engagement, means assisting the centrifugal force, and yieldable means for counteracting the centrifugal force imparted to the friction members.

2. A clutch comprising a driving shaft, a flywheel secured thereto, a dust shield secured to the flange of the flywheel, a driven shaft, a drum on the driven shaft positioned within the flywheel, anchors on the dust shield, friction elements pivoted on the anchors and movable angularly into drum engagement, levers pivoted on the dust shield, means connecting the levers to the friction elements, a sleeve on the driven shaft, links connecting the sleeve to the levers, a collar on the sleeve, and means for mechanically moving the sleeve to actuate the levers to engage the friction elements with the drum.

ADIEL Y. DODGE.